(12) United States Patent
Lumbard (10) Patent No.: US 9,591,114 B2
(45) Date of Patent: Mar. 7, 2017

(54) FOLDABLE CURVED WIRELESS COMMUNICATION DEVICE FOR INSERTION INTO HIP POCKET

(71) Applicant: John Ashmore Lumbard, Hollis, NH (US)

(72) Inventor: John Ashmore Lumbard, Hollis, NH (US)

( * ) Notice: Subject to any disclaimer, the term of this patent is extended or adjusted under 35 U.S.C. 154(b) by 288 days.

(21) Appl. No.: 14/143,117

(22) Filed: Dec. 30, 2013

(65) Prior Publication Data

US 2015/0011272 A1 Jan. 8, 2015

Related U.S. Application Data

(63) Continuation-in-part of application No. 13/858,344, filed on Jul. 5, 2013, now abandoned.

(51) Int. Cl.
*H04M 1/02* (2006.01)
*G06F 1/16* (2006.01)

(52) U.S. Cl.
CPC .......... *H04M 1/0279* (2013.01); *G06F 1/165* (2013.01); *G06F 1/1616* (2013.01); *H04M 1/0216* (2013.01)

(58) Field of Classification Search
CPC .. H04M 1/0208; H04M 1/0206; H04M 1/021; H04M 1/0214; H04M 1/0212; H04M 1/0216; H04M 1/0218; H04M 1/022; H04M 1/0247; H04M 1/0279; H01L 2251/5338; G06F 1/1616
USPC ......... 455/575.1, 575.3, 575.4, 575.5, 575.7, 455/575.8
See application file for complete search history.

(56) References Cited

U.S. PATENT DOCUMENTS 3,400,226 A * 9/1968 Krumreich .......... H04M 1/0202
220/4.21
6,470,175 B1 10/2002 Park et al.
6,708,046 B1 3/2004 Takagi
(Continued)

OTHER PUBLICATIONS

International Search Report Corresponding to PCT/US2014/045338 mailed Mar. 10, 2015.
(Continued)

*Primary Examiner* — Patrick Hawn
(74) *Attorney, Agent, or Firm* — Davis & Bujold PLLC; Michael J. Bujold (57) ABSTRACT

A mobile communication device which comprises a first member with first surface having a first curvature and a second surface having a second curvature; a second member having first surface with a third curvature and a second surface with a fourth curvature. A hinge pivotally connects the first and second members with one another such that they are movable between opened and closed configurations. The first and the second curvatures of the first member combine with one another and form a combined average curvature for the first member and the third and the fourth curvatures of the second member combine with one another and form a combined average curvature for the second member. The combined average curvature for the first member and the combined average curvature for the second member combine with one another to form a combined average curvature for the communication device which is 8 feet or less.

19 Claims, 11 Drawing Sheets

(56) References Cited

U.S. PATENT DOCUMENTS

| | | | |
|---|---|---|---|
| 6,738,111 B2* | 5/2004 | Kawata | G04G 17/045 |
| | | | 349/58 |
| 6,961,593 B1 | 11/2005 | Lonka et al. | |
| 7,469,156 B2 | 12/2008 | Kota et al. | |
| 7,640,043 B2 | 12/2009 | Komiyama | |
| 7,885,695 B2 | 2/2011 | Kauhaniemi et al. | |
| 8,106,407 B2* | 1/2012 | Yamazaki | H01L 27/32 |
| | | | 257/81 |
| 8,108,018 B2* | 1/2012 | Jung | H04M 1/0237 |
| | | | 361/814 |
| 8,150,480 B2 | 4/2012 | Johansson | |
| 8,150,482 B2 | 4/2012 | Matsuoka | |
| 8,462,289 B2 | 6/2013 | Nishizawa et al. | |
| 8,467,172 B2 | 6/2013 | Sugimori et al. | |
| 8,478,369 B2 | 7/2013 | Ogatsu | |
| 8,497,516 B2* | 7/2013 | Yamazaki | H01L 27/32 |
| | | | 257/81 |
| 8,634,885 B2* | 1/2014 | Chang | H04M 1/0277 |
| | | | 361/679.02 |
| 8,735,899 B2 | 5/2014 | Yamazaki et al. | |
| 9,001,010 B2* | 4/2015 | Jeon | G06F 1/00 |
| | | | 345/108 |
| 9,113,553 B2* | 8/2015 | An | H05K 5/0217 |
| 2002/0006809 A1 | 1/2002 | Kubo et al. | |
| 2002/0027636 A1* | 3/2002 | Yamada | G02F 1/133305 |
| | | | 349/155 |
| 2004/0157653 A1 | 8/2004 | Kato | |
| 2004/0212956 A1 | 10/2004 | Kuivas et al. | |
| 2006/0205450 A1* | 9/2006 | Amano | G06F 1/1624 |
| | | | 455/575.4 |
| 2006/0273304 A1* | 12/2006 | Cok | H01L 51/0096 |
| | | | 257/40 |
| 2007/0049068 A1 | 3/2007 | Yanagida | |
| 2008/0139257 A1 | 6/2008 | Dai et al. | |
| 2009/0042610 A1 | 2/2009 | Kota et al. | |
| 2009/0122015 A1 | 5/2009 | Demuynck | |
| 2009/0174666 A1 | 7/2009 | Matsuoka | |
| 2009/0176542 A1 | 7/2009 | Matsuoka | |
| 2009/0318203 A1 | 12/2009 | Anand et al. | |
| 2011/0105204 A1 | 5/2011 | Kouno | |
| 2012/0151760 A1 | 6/2012 | Steijner | |
| 2013/0012264 A1 | 1/2013 | Mitsunaga | |
| 2013/0215011 A1 | 8/2013 | Ke | |
| 2013/0278873 A1 | 10/2013 | Enomoto | |

OTHER PUBLICATIONS

LG G Flex: Curved Phone with Ergonomic Design LG USA, URL: http://www.lg.com/us/mobile-phones/gflex/design.jsp?cmpid=sem|mu|lggflex_2014campaign|bing&s_kwcid=TC-18467-15109052528-be-3581988023, 2 Pages, Dated at least as early as Nov. 30, 2013.

Samsung's New Curvy, Sexy Cell Phone! It Rocks! Literally! PerezHilton.com, URL: http://perezhilton.com/2013-10-09-samsung-debuts-new-curved-cell-phone-galaxy-round-mobile#.UyymA8JOXhc, 3 Pages, Dated Oct. 9, 2013.

By Doug Aamoth @daamoth, New Google Phone Has Curved Screen, Latest Android Version | TIME.com, http://techland.time.com/2010/12/06/new-google-phone-has-curved-screen-latest-android-version/, 3 Pages, Dated Dec. 6, 2010.

* cited by examiner

FOLDABLE CURVED WIRELESS COMMUNICATION DEVICE FOR INSERTION INTO HIP POCKET

CROSS-REFERENCE TO RELATED APPLICATIONS

This application is a continuation-in-part of U.S. Non-Provisional application Ser. No. 13/858,344 filed Jul. 5, 2013, and the entire disclosure of that application is hereby incorporated herein by reference.

FIELD OF THE INVENTION

Background of the Invention

A mobile communication device, such as a "flip phone" or "clamshell" type handheld mobile communication device is generally known in the art. Such device typically comprises a first body member and a second body member which are pivotably coupled or connected together along a first edge by a conventional hinge or linkage mechanism such that the first member can be rotated with respect to the second member, between a stored "closed" position or configuration and an in-use "opened" position or configuration. The first body member is typically referred to as a lid member while the second member is commonly referred to as a base member.

The lid member commonly includes a graphical display while the base member typically includes a keyboard or some other alphanumeric input device. The graphical display and keyboard are typically located on the inwardly facing surfaces of the respective members. In the closed configuration, the inwardly facing surfaces of the lid and base members face one another and thus are not generally accessible by a user of the mobile communication device. In the opened configuration, however, the inwardly facing surfaces of the lid and base members generally form an angle of between about 120 and 180 degrees with respect to one another and are thus accessible/visible by the user of the mobile communication device to facilitate use thereof.

It is to be appreciated that for a mobile communication device, such as a flip phone device, it may be desirable for one or more input buttons or displays to be accessible when the mobile communication device is in the closed configuration. For example, a user of the mobile communication device may desire to check the status of the device, control media, silence a ringer, play a game, use an integrated camera, or send or receive other information while the mobile communication device is in the closed configuration. Therefore, the mobile communication device may further include one or more interface elements, such as an exterior touch screen, on an interface surface which is located on an exposed outwardly facing surface or along an perimeter edge of the mobile communication device in order to be accessible when the flip phone is in a closed configuration.

In a conventional mobile communication device, any interface element(s) on an outer surface of the device may not be easily accessible when the mobile communication device is in the opened configuration. For example, when the mobile communication device is in the opened configuration, the outer surface with the interface elements may not be facing in the same direction as the inwardly facing surfaces which supports the graphic display and/or the keyboard, for example. Accordingly, such interface element(s) may also be partially or completely hidden by the lid and/or the base members when the mobile communication device is in the opened configuration. Therefore, a conventional approach to allow access to interface elements, when the mobile communication device is in the opened configuration, is to duplicate one or more of these interface element(s), e.g., to locate such interface element(s) both an outwardly as well as an inwardly facing surface of the mobile communication device. However, this, in turn, leads to increase cost, size and/or complexity for the mobile communication device.

Mobile communication devices have always involved compromises, which mostly result from a desire to produce complicated devices with many gadgets and features that fit into a relatively small package for easy transport. The advent of touchscreen smartphones has exacerbated the problem because consumers want phones with large screen displays. This conflict was recently illustrated in North America, where mobile phone leaders, opted to roll out LTE offerings in the 700 MHZ frequency band. Such frequency bands (Band 17, 704-746 MHZ and Band 13, 746-786 MHZ) are lower than the legacy cellular frequency band used in North America (Band 5, 824-894 MHZ). However, the consumer demand for smaller, pocket-friendly devices has reduced the available antenna length and overall volume or interior space for the current designs of the mobile communication devices. Reducing the length of the antenna correspondingly tends to reduce the antenna bandwidth and overall efficiency. This reduction of length of the antenna length causes significant controversial compromises because lower frequencies have longer wavelengths and, therefore, typically require longer antennas in order to maintain radiation efficiency.

SUMMARY OF THE INVENTION

Despite the wide variety of mobile phones/communication devices available on the market today, there still remains a need for a communication device which not only incorporates the newest features but does so in a consumer friendly, easily transportable, and comfortable manner. Mobile communication devices are an essential aspect of the average consumer's lifestyle and as such, are carried wherever the consumer goes. However, in order to leave their hands free, many consumers carry their communication devices in their hip pockets despite an awkward fit and discomfort. To compensate for such discomfort, some users only partially insert their communication devices into their hip pockets, which then have a tendency to fall out and thereby create a risk of serious damage.

One of the main objects of the present invention is to provide a design, for a mobile communications device, that fits easily and comfortably in a hip pocket of a owner/user, similar to the fit achieved by a "broken-in" wallet. An embodiment of this invention is a rigid communication device which has a generally curved body, when in its closed configuration, which easily and comfortably slides and fits into a rear hip pocket of a mobile communication device owner/end-user without any significant discomfort.

Another object of the present invention is to provide an accessory that is much thicker than today's wireless devices and offers increased surface area, when in the opened configuration.

Yet another object of the present invention is to provide an accessory that can offer an antenna which has an increased transmission/reception length, when the communication device is in the open configuration, which can accommodate lower frequencies which have longer wavelengths and thereby maintain radiation efficiency for the communication device.

According to one embodiment of the invention, the mobile communication device comprises a full QWERTY keyboard; a display screen; a removable battery; antennae; and at least one speaker. The preferred embodiment includes all of these components enclosed within a rugged clamshell case that is designed to absorb the shock of an inadvertent fall without "spiderweb" damage to the display that commonly occurs with the display screen(s) of currently available smartphones/communication devices and/or damage to the internal electronic components.

According to a preferred embodiment, two display screens are provided, e.g., one large touchscreen and a smaller electronic-paper screen for writing messages. The electronic-paper screen generally consumes very little power, so battery life can be extended by turning off the large display and only using the small display for messaging, for example. The battery source is larger than that found in today's smartphones, and it can be removed and replaced with charged spare batteries—thus allowing a user to travel for many days without recharging.

In a preferred form of the invention, the mobile communication device has 700 MHz-band antennae of greater length than has been previously provided for in prior art smartphones/communication devices, which provide better reception and improved transmission/reception sound quality.

Finally, a preferred embodiment utilizes a display screen with a curved glass surface in order to increase the average radius of curvature of the device. It is now possible to manufacture rigid curved touchscreen glass, thus allowing devices that precisely conform to the consumer's body.

The wallet-like form factor allows significant thickness, relative to current designs, and a much-greater surface area for screens and for a full-featured keypad. The additional volume of the mobile communication device can be used to accommodate a larger, removable battery, better speakers, more-efficient antennae, and other features.

The old-fashioned telephone handset is still the gold standard for comfortable handheld conversation. A carefully-shaped folding hip phone can offer a comparable level of privacy and sound quality, and end the practice of shouting into the air while talking. This design, according to the present invention, absorbs the sound of the user's voice into the keyboard, and reflects it back toward his or her face. The curve in the screen also prevents contact between the consumer's face and the display, thus avoiding smudging of the screen.

The mobile communication device can be carried in a shirt pocket, either for use in speaker phone mode or for listening to music with the built-in MP3 player.

Closing the clamshell, after completion of a call, terminates the phone connection and turns off power to the display with certainty and finality that is not found in today's smart phones. The latter typically require two steps to complete the same action, and are thus responsible for a lot of unintended dialing.

When closed, the clamshell design will protect the two displays from scratches and the "spider web" cracking that has become all too common. The displays are mounted on curved-but-rigid sheets of carbon fiber or some other strong, lightweight, and rigid and durable material; the exterior shell of the phone is rigid and padded at the crown and hinges, but flexible enough at the edges to absorb a drop from chest level—regardless of orientation of the mobile communication device upon landing.

BRIEF DESCRIPTION OF THE DRAWINGS

The present invention will be understood by reference to the following detailed description, which should be read in conjunction with the appended drawings. It is to be appreciated that the following detailed description of various embodiments is by way of example only and is not meant to limit, in any way, the scope of the present invention.

FIGS. 7A, 7B, 7C, 7D, 7E, 7F, 7G, 7H and 7I are diagrammatic side elevational views of various embodiments of the mobile communication device, according to the present invention, which are each shown in a closed configuration so as to illustrate the combined radius of curvature for the first and the second members and the combined radius of curvature for the communication device.

DETAILED DESCRIPTION OF THE PREFERRED EMBODIMENTS

Figure 1:
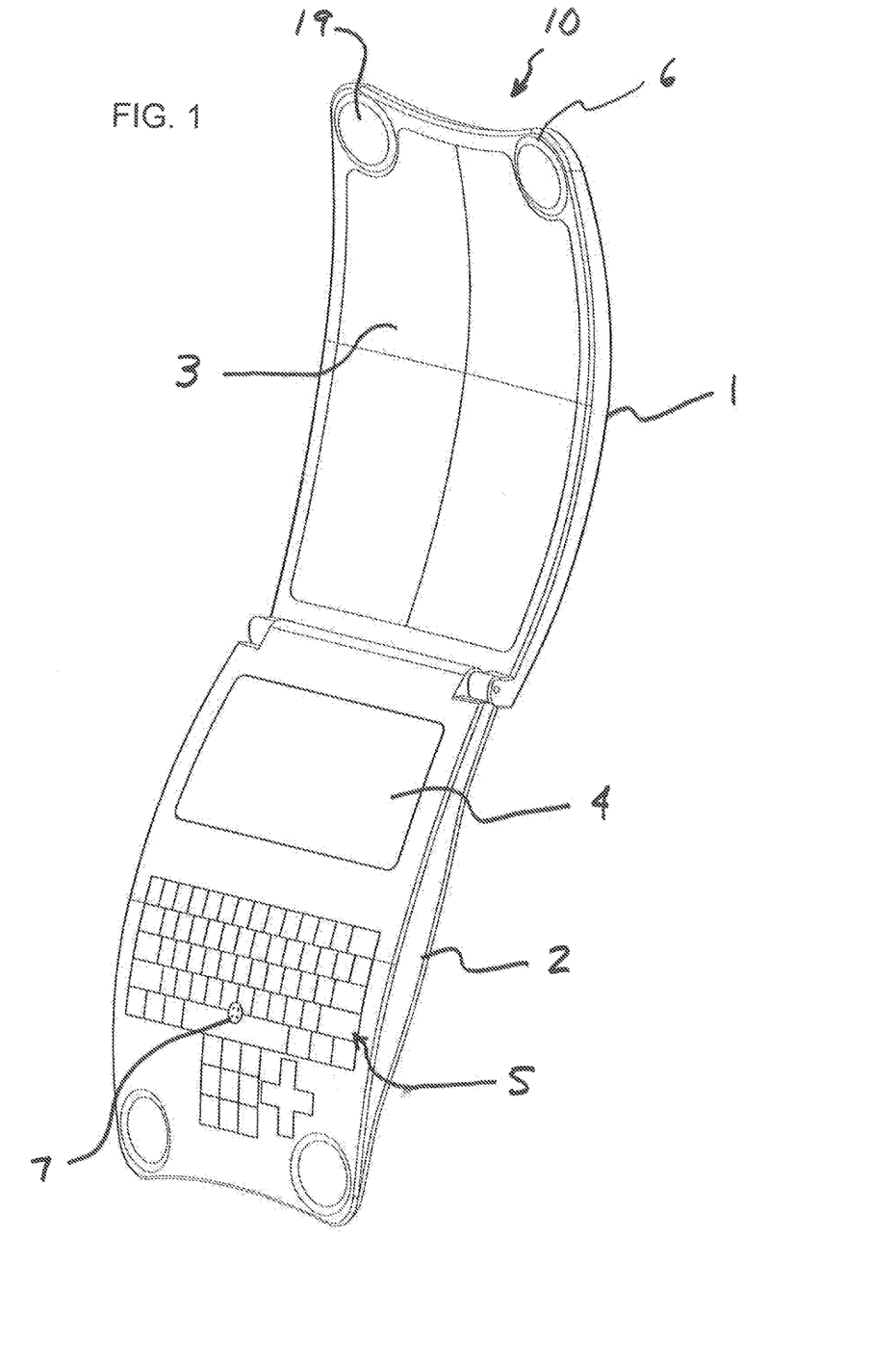
FIG. 1 is a diagrammatic front perspective view of the mobile communication device which comprises first and second members shown in an opened configuration.

FIG. 1 illustrates an embodiment of the invention in an open configuration, with the first member 1 pivoted or rotated with respect to the second member 2, about the hinge, into the opened configuration. The large touchscreen or other display screen 3 of the first member 1 is backed by a curved sheet of strong and rigid material, such as carbon fiber. In this embodiment, a smaller electronic-paper screen 4 is also provided on the second member 2 so that, when utilized as an applications device, the consumer will be able to type messages while viewing a document online. To facilitate use of the device in this manner, this embodiment also provides a full QWERTY keyboard 5, located below the smaller screen 4. This keyboard 5 is shown with a full set of the most-commonly-used symbols, preferably all with tactile rubberized buttons that facilitate rapid typing.

This opened configuration is also for utilization as a mobile communication device. When speaking, the consumer typically places his or her ear against the earphone 6 which protrudes from an upper corner of the inner surface of the first member, for example, as shown in FIG. 1, and speaks into a first microphone 7 located near the central portion of the inner surface of the second member 2. This embodiment provides several advantages over the prior art. First, the curve of the display screen will generally keep the display screen 3 free of the smudging that is common to most of today's devices. Second, due to the average curvature of the first and the second members 1, 2, as discussed below in further detail, the consumer is provided with increased privacy, in a manner similar to that achieved by the older telephone handset. This arrangement assists with providing more secure and private conversation, particularly in restaurants, on airplanes, and/or in other public locations. That is, the communication device 10, according to the present invention, makes it much easier to hear the conversation, via the earpiece 6, as well as facilitate reception of the sound emitted toward the first microphone 7. The first member also supports a conventional camera 19.

Another aspect of the present invention illustrated is the clamshell design—similar to the flip phones that were popular before smartphones were introduced. However, the communication device of FIG. 1 is designed to be significantly larger than the prior art. The additional size is made possible by the average curvature of the communication device—described below in further detail—which allows it to be comfortably inserted in the typical hip pocket of an owner. Greater width, length, and thickness of the communication device 10 allow more display area, a full QWERTY keyboard 5, and other advantages over the prior art. A full QWERTY keyboard 5 with tactile buttons includes punctuation and symbols, delete and backspace buttons, and a navigation button to easily place the cursor where desired.

As previously discussed, lower frequency bands (such as band 17, 704-746 MHZ and band 13, 746-786 MHZ) have longer wavelengths and, therefore, require longer antennas in order to maintain the adequate radiation efficiency. The most commonly used frequency band for LTE transmission is in the 700 MHZ band. The antenna elements used for reception in the 700 MHZ band should ideally be 7.4 inches to 8.5 inches long—for 3G, the associated antennae generally have a shorter length which is typically less than about 7.0 inches. Current smartphones are generally not long and/or wide enough for adequately accommodating antennae of this length, and the compact size of such communication devices tend to increase interference from electronic components. The clamshell design of the present invention, when manipulated into the opened configuration, offers greater length, width, surface area and volume thereby resulting in greatly improved reception.

Again, most consumers typically carry his/her communication device 10 in a hip pocket despite any awkwardness and/or discomfort that results from trying to fit a cuboid-shaped item into a hemispherical pocket with a crescent shaped mouth, for example. As shown in FIG. 1, a curved and rigid screen 3 can be sufficiently protected by a folding device that has flexible edges for comfort and ruggedness while still providing a greater curvature which is typically necessary for ease of transport via a hip pocket. The embodiment of FIG. 1 offers a large screen, comparable to those in today's most-popular smart phones, as well as a smaller electronic-paper screen 4, located above the keyboard 5, which can be used to generate e-mails and text messages without an excessive drain of battery power. Alternately both screens can be used at the same time to review a document or a web page while also generating an e-mail or a text message.

Figure 2:
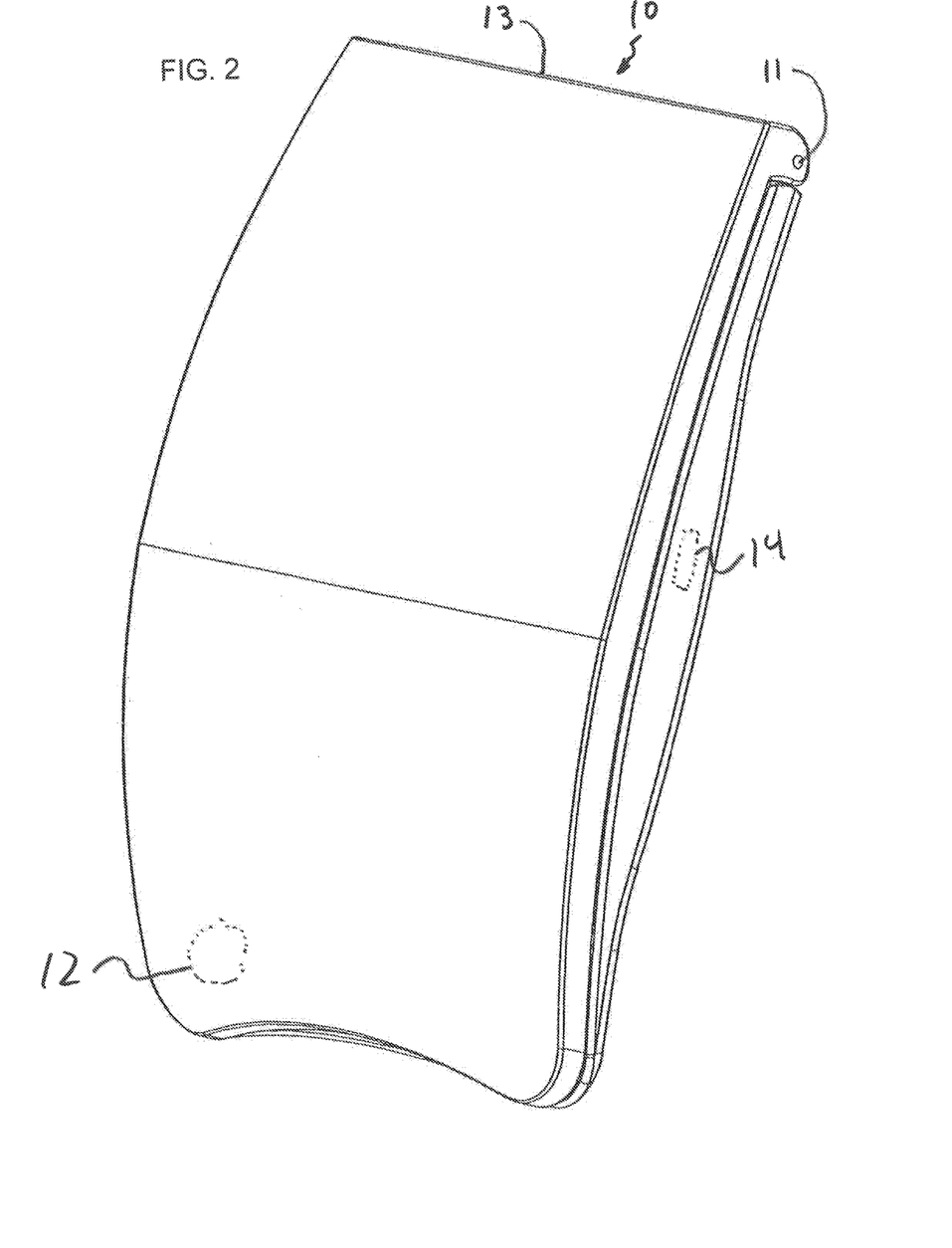
FIG. 2 is a diagrammatic front perspective view of the mobile communication device of FIG. 1, shown in a closed configuration.
Figure 3:
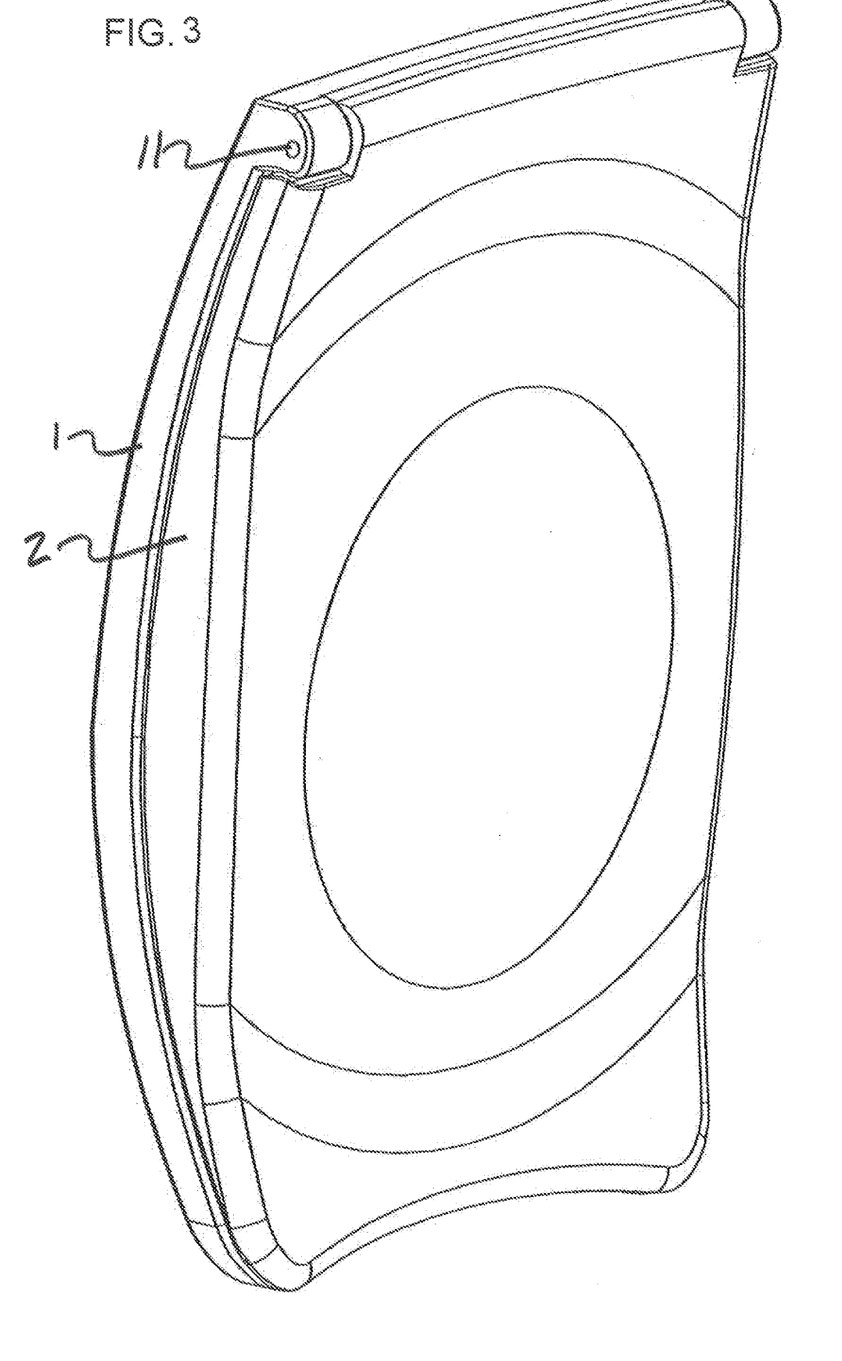
FIG. 3 is a diagrammatic rear perspective view of the mobile communication device of FIG. 2 in the closed configuration.

FIGS. 2 and 3 show the mobile communication device 10 in a closed configuration, with a view of the exterior of the first member 1. If desired, the hinges 11 and/or edges of the communication device may be covered and/or padded to assist with absorbing shock in the event that the communication device 10 is inadvertently or accidently dropped. If desired, a cover 12, generally shown in the bottom left corner of the second member 2, may be provided for covering the lens of the camera 19. A consumer would typically insert the smart phone/communication device 10 into his/her hip pocket with the hinge 11 facing upward.

The end user/owner can speak into the communication device, when in the closed configuration, via a second microphone 13 provided at the end of the communication device adjacent the hinge 11. In addition, one or more speakers 14 may be formed in a side wall or end wall of the communication device 10 so it could be used in a speaker phone mode while being carried in a breast pocket.

Figure 4:
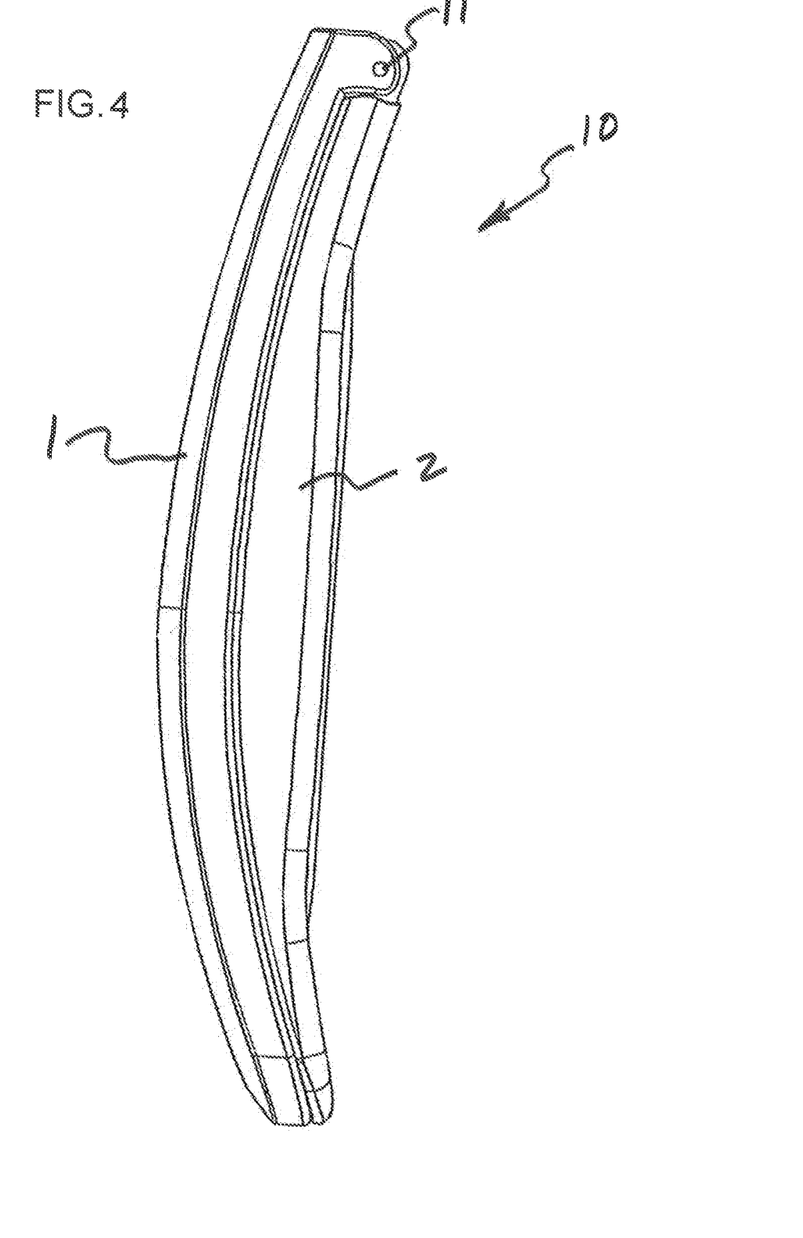
FIG. 4 is a diagrammatic side elevational view of the mobile communication device of FIG. 2 in the closed configuration.

FIG. 4 is a side view, showing the longitudinal curvature of the exterior of the first member 1 and the complex longitudinal curvature of the exterior face of the second member 2 along a longitudinal axis A of the mobile communication device 10.

Figure 5:
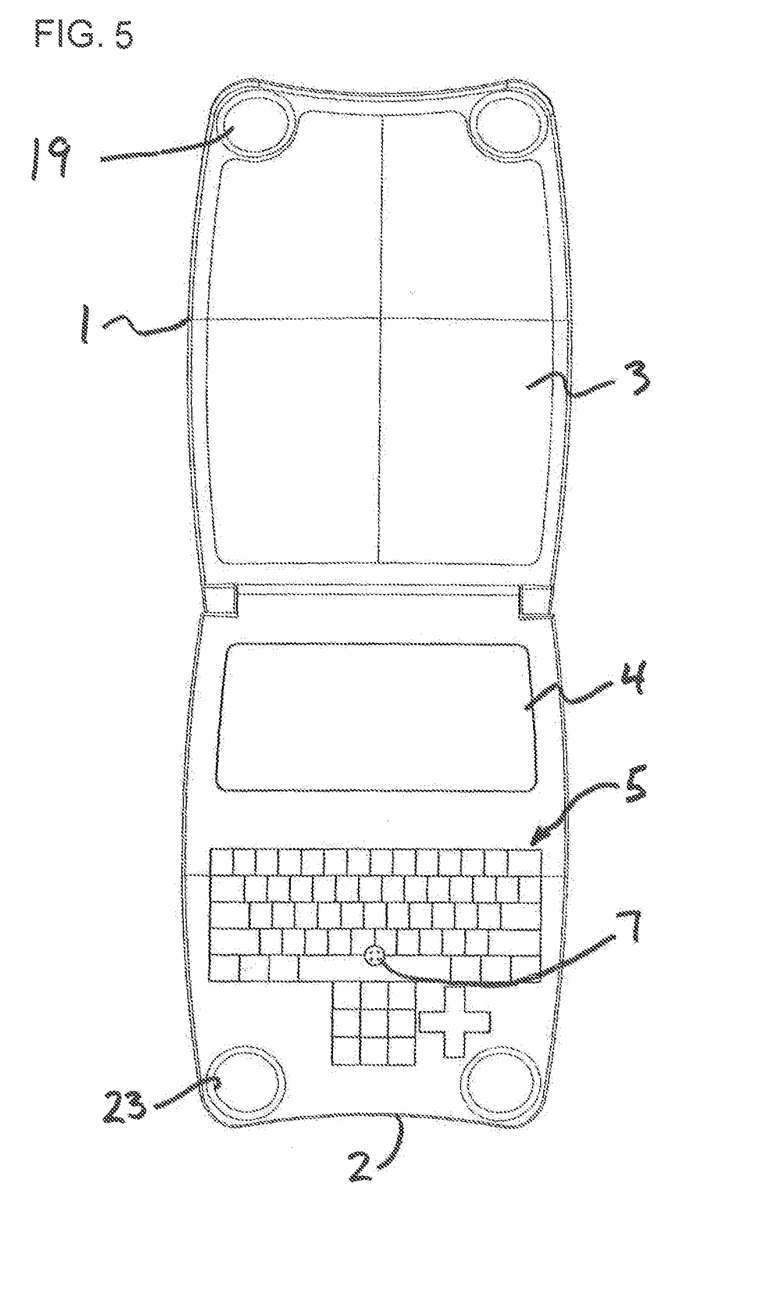
FIG. 5 is a diagrammatic front elevational view showing the inwardly facing surfaces of the first and the second members.

FIG. 5 is a wireframe detail of the lower left corner of the interior face of the second member 2, showing a portion of the keyboard 5 as well as the main microphone 7, a number pad 20, and the depression or well 23 which receives the camera housing of the first member 1 when the communication device 10 is in the closed configuration.

Figure 6:
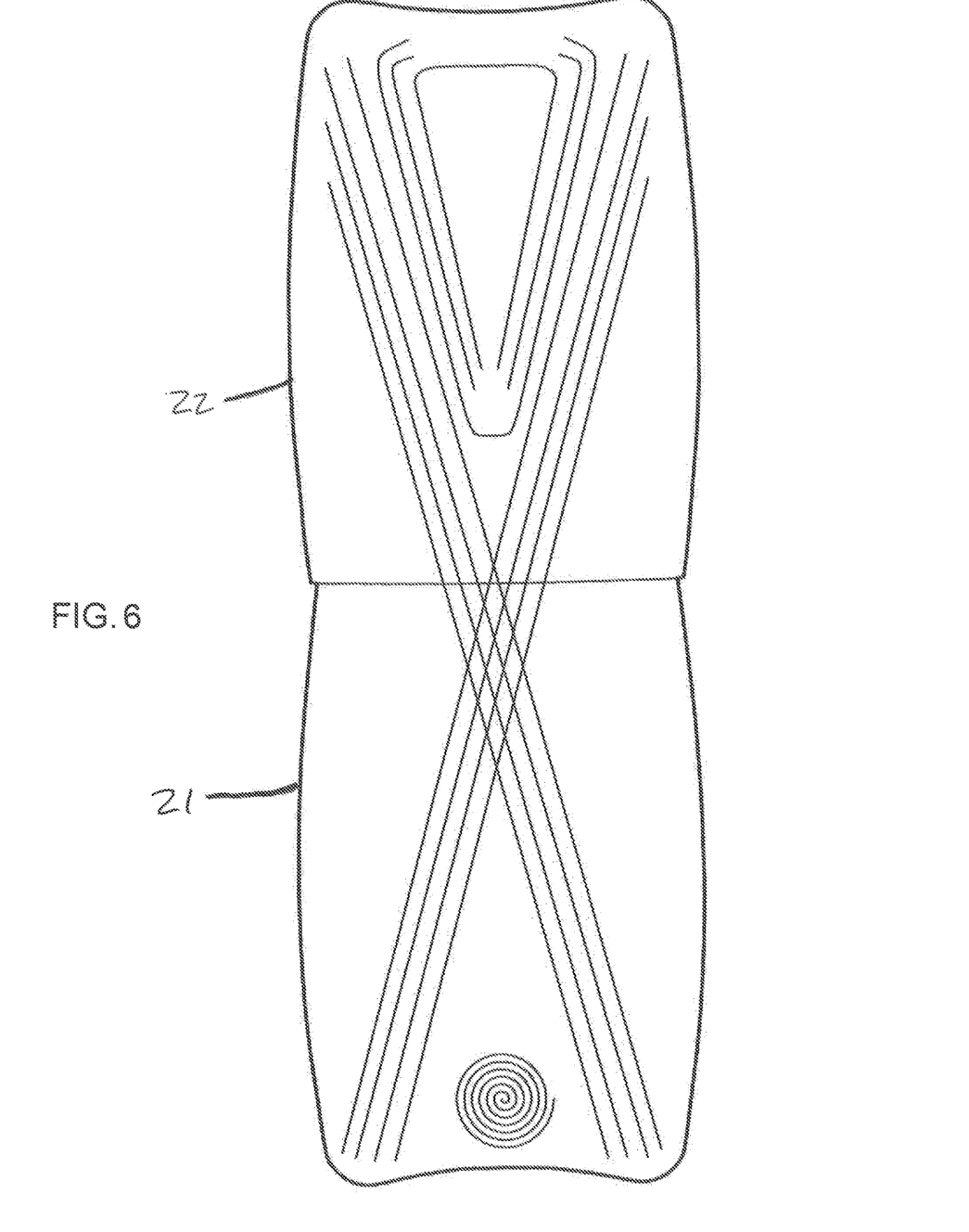
FIG. 6 is a diagrammatic view showing one possible arrangement for 700 MHz-band antennae according to the invention.

FIG. 6 is a diagrammatic view showing one possible layout for half-wavelength 700 MHz-band antennae, printed on two sheets 21, 22 of material. There is little separation between the two sheets in the (thin) first member 1, but much greater separation in the thicker body of the second member 2. The second member 2 also holds a hemispherical antenna. Interference from the electronics of the communication device 10 will be mostly concentrated in the second member 2; the first member 1 will be relatively free of antenna interference when compared to other smartphones.

Turning now to FIGS. 7A-7I, various embodiments of the communication device, shown in the folded closed configuration, will now be described. It is to be appreciated that each of FIGS. 7A-7I illustrate various alternative embodiments which have surfaces 40, 43, 45, 47, curvatures C1, C2, C3, C4, average curvatures A1, A2, A3, radiuses of curvatures R1, R2, R4, R5, and average radii of curvatures R3, R6, R7. It is to be appreciated that these embodiments merely represent a number of various implementations which all fall within the spirit and scope of the present invention.

For each of FIGS. 7A-7I, the first member 1 has an outwardly facing first surface 40 which defines a first curvature C1 that has a corresponding first radius of curvature R1. The opposing side of the first member 1 has an inwardly facing second surface 43 which defines a second curvature C2 that has a corresponding second radius of curvature R2. The first curvature C1 and the second curvature C2 combine with one another form a first average curvature A1 for the first member 1. Likewise, the first radius of curvature R1 and the second radius of curvature R2 combine with one another to form a first average radius of curvature R3 for the first member 1.

The second member 2 has an inwardly facing third surface 45 which defines a third curvature C3 that has a corresponding third radius of curvature R4. The opposing side of the second member 2, has an outwardly facing fourth surface 47 which defines a fourth curvature C4 that has a corresponding fourth radius of curvature R5. The third curvature C3 and the fourth curvature C4 combine with one another to form a second average curvature A2 for the second member 2. Likewise, the third radius of curvature R4 and the fourth radius of curvature R5 combine with one another to form a second average radius of curvature R6 for the second member 2.

In addition, the first average curvature A1, for the first member 1, and the second average curvature A2, for the second member 2, combine with one another to form a device average curvature A3 for the communication device 10. Likewise, the first average radius of curvature R3 and the second average radius of curvature R6, for the first and second members 1, 2, combine with one another to form a device average radius of curvature R7 for the communication device 10.

Figure 7A:
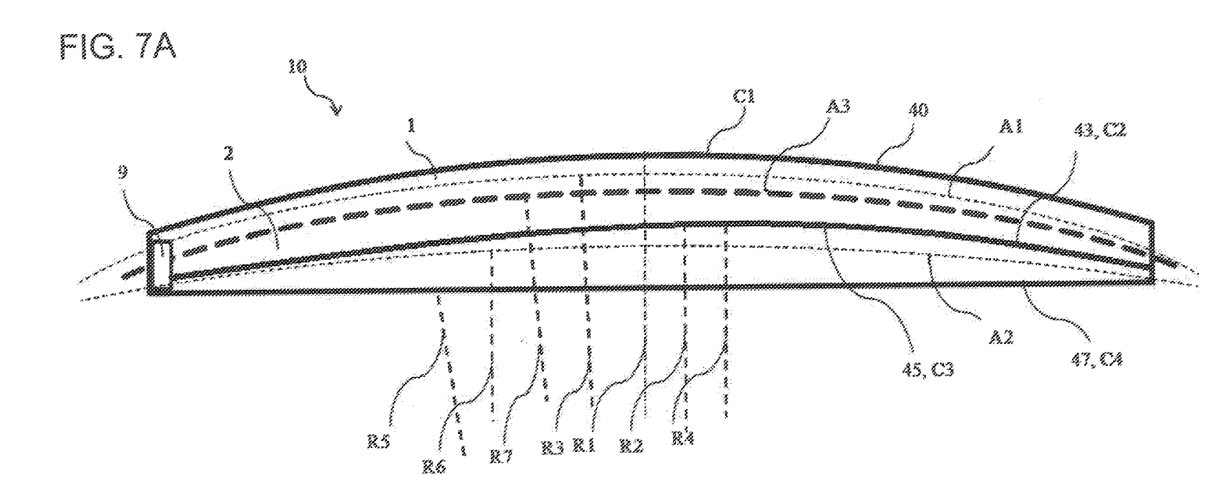

Turning now to FIG. 7A, as generally shown therein, the first member 1 has a generally curved outwardly facing first surface 40 and a generally curved second surface 43, while the second member 2 has a generally curved third surface 45 and a generally planar outwardly facing fourth surface 47. The first, the second and the third surfaces 40, 43, 45, respectively, have first, second, and third curvatures C1, C2, C3 with corresponding radiuses of curvatures R1, R2, R4 which typically range between 2 inches and 8 feet, and more preferably range between about 6 inches and about 24 inches or so. The first average curvature A1 of the first member 1 has a first average radius of curvature R3 for the first member 1 which typically ranges between 2 inches and 8 feet, and more preferably range between about 6 inches and about 24 inches or so; the second average curvature A2 for the second member 2 has a second average radius of curvature R6 for the second member 2 which typically ranges between 2 inches and 8 feet, and more preferably range between about 6 inches and about 24 inches or so; and device average curvature A3 has a device average radius of curvature R7 which typically ranges between 2 inches and 8 feet, and more preferably range between about 6 inches and about 24 inches or so. The fourth surface 47 has a curvature C4 of approximately zero and thus a corresponding radius of curvature R5 which is approaching infinity.

Figure 7B:
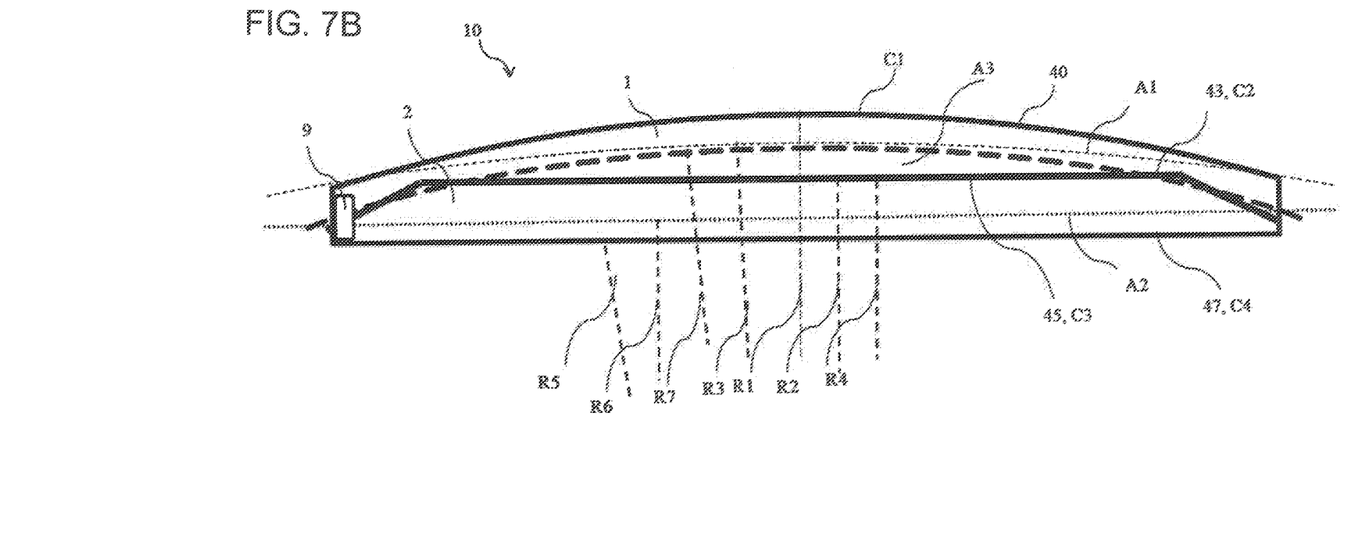

Turning now to FIG. 7B, the first member 1 has a generally curved outwardly facing first surface 40 while the second member 2 has a generally planar outwardly facing fourth surface 47. The first surface 40 has a first curvature C1 with a corresponding radius of curvature R1 which typically ranges between 2 inches and 8 feet, and more preferably ranges between about 6 inches and about 24 inches or so. Like the fourth surface 47, the second and third surfaces 43, 45 have curvatures C2, C3 approaching zero, e.g., both of those surfaces are substantially planar. Accordingly, the corresponding radiuses of curvatures R2, R4, R5, for the second, the third and the fourth surfaces 43, 45, 47, are each approaching infinity.

The resulting average curvature R6, for the second member 2, is approximately zero and has a corresponding second average radius of curvature R6 which approaches infinity. According this embodiment, only the outwardly facing first surface 40 of the first member 1 is curved with a first curvature C1. As such, the first radius of curvature R1 is the only radius of curvature that does not approach infinity but instead is approximately between 2 inches and 8 feet, and more preferably ranges between about 6 inches and about 24 inches or so. The resulting first average curvature A1 for the first member 1 has a corresponding first average radius of curvature R3 of between 2 inches and 8 feet, and more preferably range between about 6 inches and about 24 inches or so. Finally, the communication device has an average curvature A3 with a corresponding average radius of curvature R7 which ranges between 2 inches and 8 feet, and more preferably ranges between about 6 inches and about 24 inches or so.

Figure 7C:
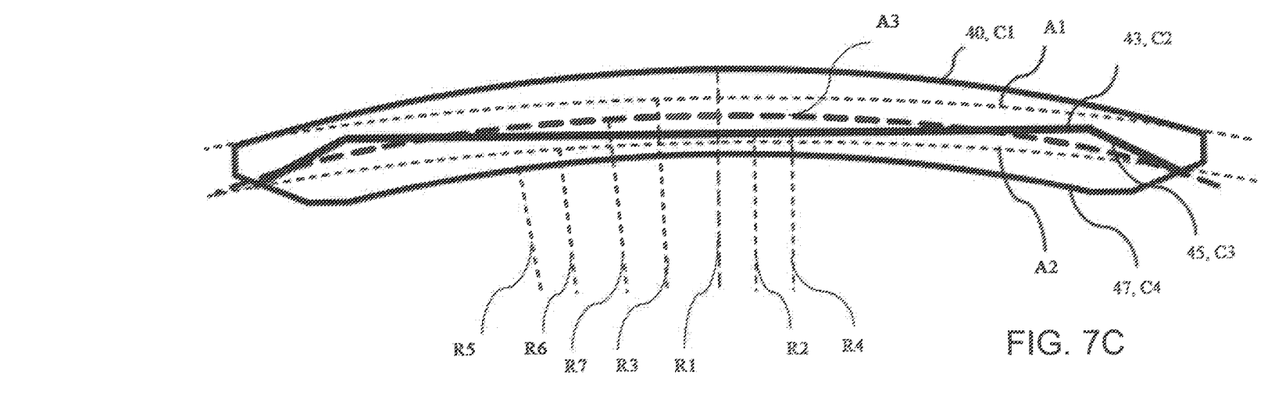

Turning now to FIG. 7O, as generally shown therein, the first member 1 has a generally curved outwardly facing first surface 40 while the second member 2 has a generally curved outwardly facing fourth surface 47. The first and the fourth surfaces 40, 47 respectively have first and fourth curvatures C1, C4 with corresponding radiuses of curvatures R1, R5 which each typically range between 2 inches and 8 feet, and more preferably range between about 6 inches and about 24 inches or so. The second and the third surfaces 43, 45 each have curvatures C2, C3 approaching zero, e.g., both of those surfaces are substantially planar. Accordingly, the corresponding radiuses of curvatures R2, R4, for the second and the third surfaces 43, 45, are each approaching infinity.

The first average curvature A1 of the first member 1 has a first average radius of curvature R3 for the first member 1 which typically ranges between 2 inches and 8 feet, and more preferably range between about 6 inches and about 24 inches or so; the second average curvature A2 for the second member 2 has a second average radius of curvature R6 for the second member 2 which typically ranges between 2 inches and 8 feet, and more preferably range between about 6 inches and about 24 inches or so; and the device average curvature A3 has a device average radius of curvature R7 which typically range between 2 inches and 8 feet, and more preferably range between about 6 inches and about 24 inches or so.

Figure 7D:
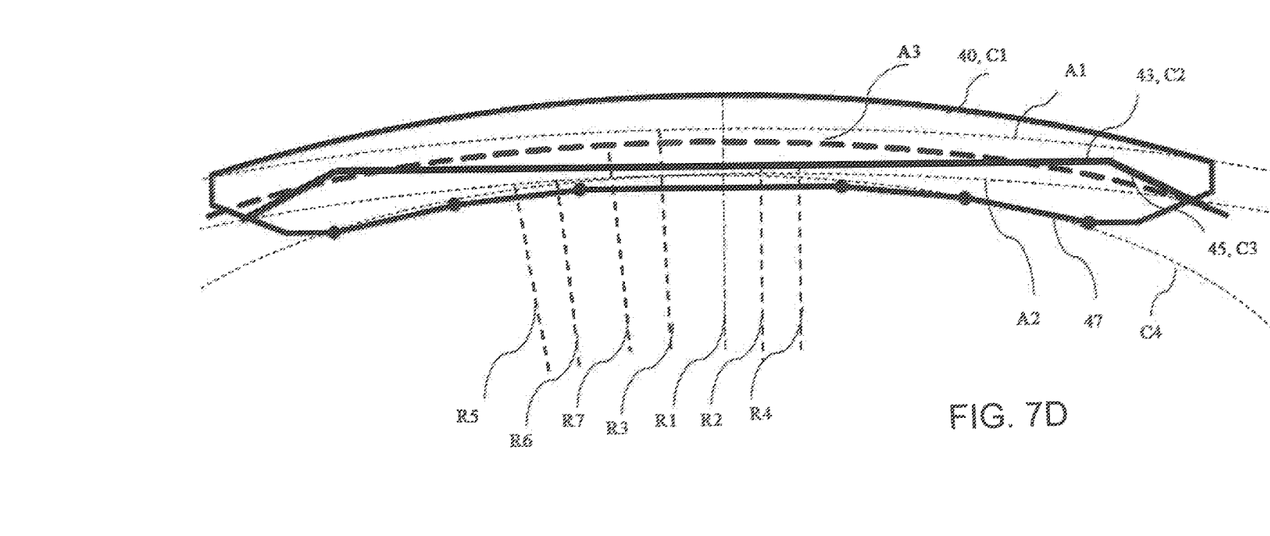

Turning now to FIG. 7D, as generally shown therein, the first member 1 has a generally curved outwardly facing first surface 40 while the second member 2 has a generally curved, concave, outwardly facing fourth surface 47 which comprises a plurality of sequentially arranged planar segments. The first and the fourth surfaces 40, 47 respectively have first and fourth curvatures C1, C4 with corresponding radiuses of curvatures R1, R5 which each typically range between 2 inches and 8 feet, and more preferably range between about 6 inches and about 24 inches or so. The second and the third surfaces 43, 45 each have curvatures C2, C3 approaching zero, e.g., both of those surfaces are substantially planar. Accordingly, the corresponding radiuses of curvatures R2, R4, for the second and the third surfaces 43, 45, are each approaching infinity.

The first average curvature A1 of the first member 1 has a first average radius of curvature R3 for the first member 1 which typically ranges between 2 inches and 8 feet, and more preferably ranges between about 6 inches and about 24 inches or so; the second average curvature A2 for the second member 2 has a second average radius of curvature R6 for the second member 2 which typically ranges between 2 inches and 8 feet, and more preferably ranges between about 6 inches and about 24 inches or so; and the device average curvature A3 has a device average radius of curvature R7 which typically ranges between 2 inches and 8 feet, and more preferably ranges between about 6 inches and about 24 inches or so.

Figure 7E:
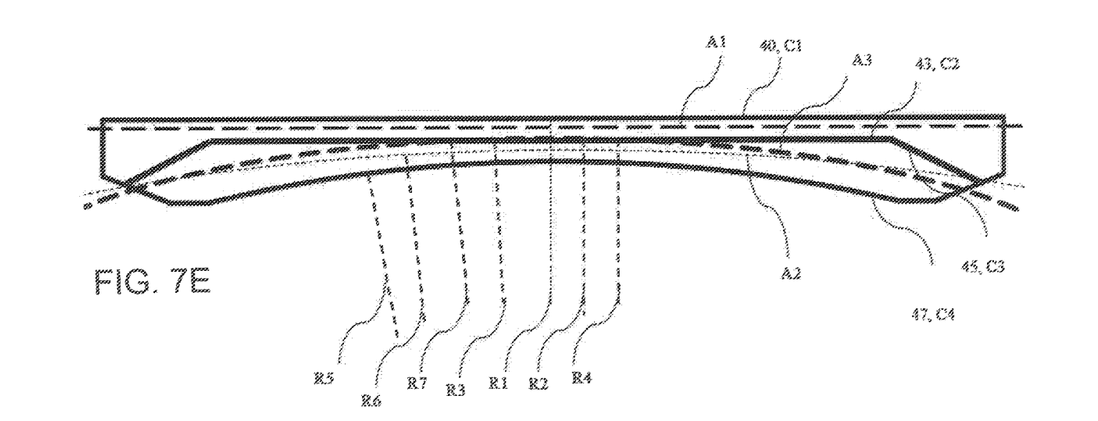

Turning now to FIG. 7E, as generally shown therein, the first member 1 has a generally planar outwardly facing first surface 40 and a generally planar second surface 43, while the second member 2 has a generally planar third surface 45 and a generally curved outwardly facing fourth surface 47. That is, the first, the second and the third surfaces 40, 43, 45 have corresponding first, second and third curvatures C1, C2, C3 which each approach zero, e.g., each of those surfaces are substantially planar. Accordingly, the corresponding radiuses of curvatures R1, R2, R4, for the first, the second and the third surfaces 40, 43, 45, respectively, are each approaching infinity. The fourth surface 47 has a corresponding fourth curvature C4 with a radius of curvature R5 which typically ranges between 2 inches and 8 feet, and more preferably ranges between about 6 inches and about 24 inches or so.

The first average curvature A1 of the first member 1 has a first average radius of curvature R3 for the first member 1 which typically is approaching infinity; the second average curvature A2 for the second member 2 has a second average radius of curvature R6 which typically ranges between 2 inches and 8 feet, and more preferably range between about 6 inches and about 24 inches or so; and the device average curvature A3 has a device average radius of curvature R7 which typically ranges between 2 inches and 8 feet, and more preferably ranges between about 6 inches and about 24 inches or so.

Figure 7F:
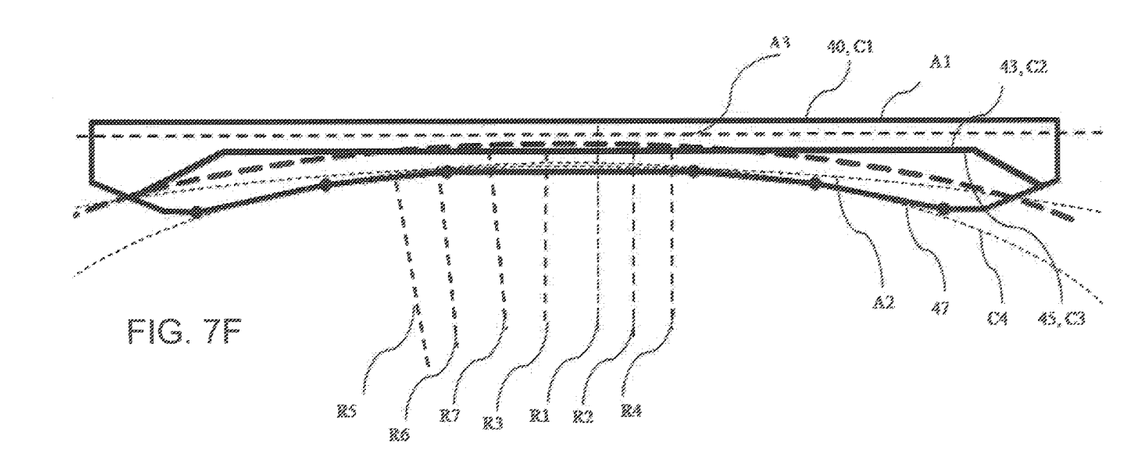

Turning now to FIG. 7F, as generally shown therein, the first member 1 has a generally planar outwardly facing first surface 40 and a generally planar second surface 43, while the second member 2 has a generally planar third surface 45 and a generally curved, concave, outwardly facing fourth surface 47. As shown, the outwardly facing fourth surface 47 is formed of a series of sequentially interconnected generally planar surfaces which together comprise and form the generally curved outwardly facing fourth surface 47. The first, the second and the third surfaces 40, 43, 45 have corresponding first, second and third curvatures C1, C2, C3 which each approach zero, e.g., each of those surfaces are substantially planar. Accordingly, the corresponding radiuses of curvatures R1, R2, R4, for the first, the second and the third surfaces 40, 43, 45, respectively, are each approaching infinity. The fourth surface 47 has a fourth curvature C4 with a radius of curvature R5 which typically ranges between 2 inches and 8 feet, and more preferably ranges between about 6 inches and about 24 inches or so.

The first average curvature A1 of the first member 1 has a first average radius of curvature R3 for the first member 1 which typically is approaching infinity; the second average curvature A2 for the second member 2 has a second average radius of curvature R6 for the second member 2 which typically ranges between 2 inches and 8 feet, and more preferably ranges between about 6 inches and about 24 inches or so; and device average curvature A3 has a device average radius of curvature R7 which typically ranges between 2 inches and 8 feet, and more preferably range between about 6 inches and about 24 inches or so.

Figure 7G:
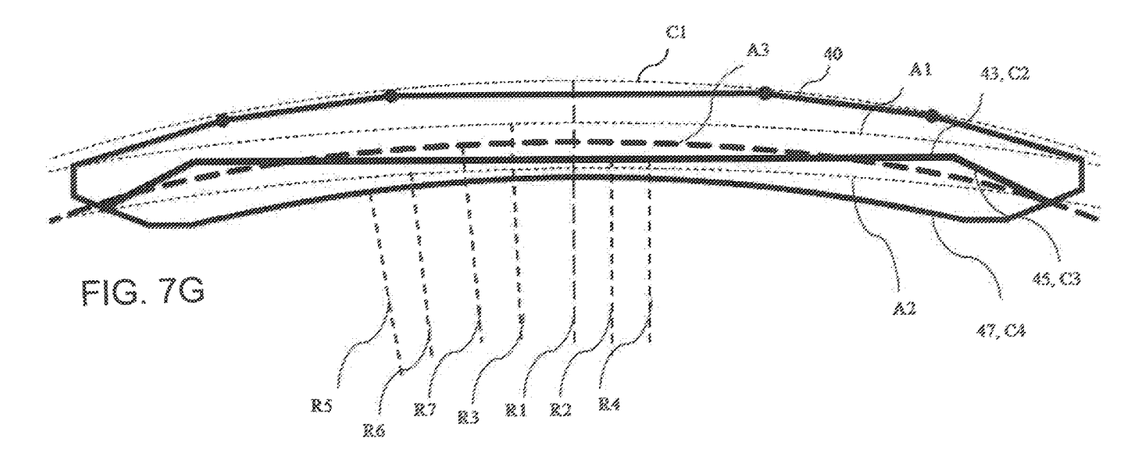

Turning now to FIG. 7G, as generally shown therein, the first member 1 has a generally curved outwardly facing first surface 40 and a generally planar second surface 43, while the second member 2 has a generally planar third surface 45 and a generally curved outwardly facing fourth surface 47. As shown, the outwardly facing first surface 40 is formed of a series of sequentially interconnected generally planar surfaces which together comprise and form the generally curved outwardly facing first surface 40. That is, the second and the third surfaces 43, 45 have second and third curvatures C2, C3 approaching zero, e.g., both of those surfaces are substantially planar. Accordingly, the corresponding radiuses of curvatures R2, R4, for the second and the third surfaces 43, 45, respectively, are each approaching infinity. The first and the fourth surfaces 40, 47, respectively, have first and fourth curvatures C1, C4 with radiuses of curvature R1, R5 which each typically range between 2 inches and 8 feet, and more preferably range between about 6 inches and about 24 inches or so.

The first average curvature A1 of the first member 1 has a first average radius of curvature R3 for the first member 1 which typically ranges between 2 inches and 8 feet, and more preferably ranges between about 6 inches and about 24 inches or so; the second average curvature A2 for the second member 2 has a second average radius of curvature R6 for the second member 2 which typically ranges between 2 inches and 8 feet, and more preferably ranges between about 6 inches and about 24 inches or so; and the device average curvature A3 has a device average radius of curvature R7 which typically ranges between 2 inches and 8 feet, and more preferably ranges between about 6 inches and about 24 inches or so.

Figure 7H:
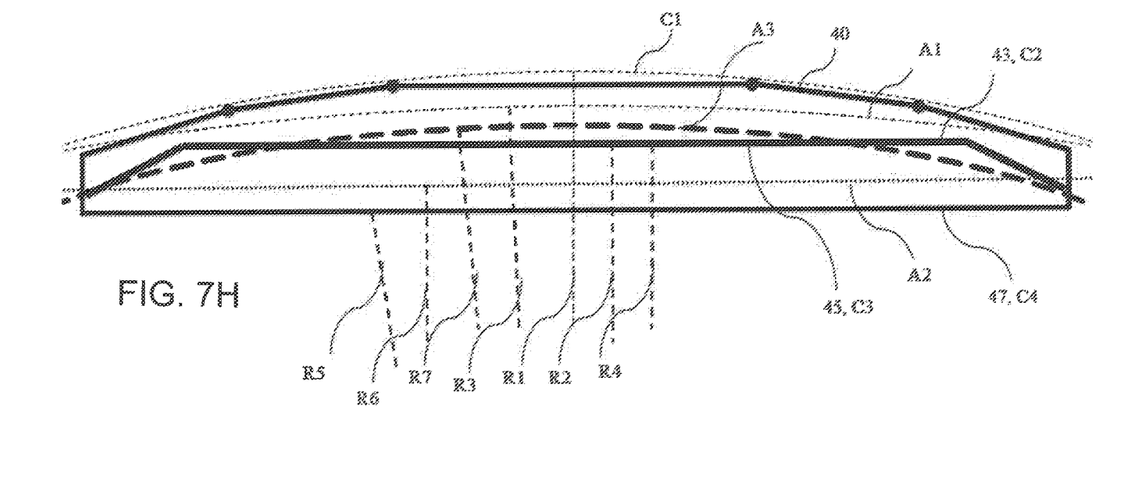

Turning now to FIG. 7H, as generally shown therein, the first member 1 has a generally curved outwardly facing first surface 40 and a generally planar second surface 43, while the second member 2 has a generally planar third surface 45 and a generally planar outwardly facing fourth surface 47. As shown, the outwardly facing first surface 40 is formed of a series of sequentially interconnected generally planar surfaces which together comprise and form the generally curved outwardly facing first surface 40. Therefore, the first curvature C1 of the outwardly facing first surface 40 of the first member 1 is the only curvature, in this embodiment, which is greater than zero. Likewise, the first radius of curvature R1 is the only radius of curvature that does not approach infinity but instead, is approximately between 2 inches and 8 feet, and more preferably ranges between about 6 inches and about 24 inches or so.

The second, the third and the fourth surfaces 43, 45, 47, respectively, have second, third and fourth curvatures C2, C3, C4 approaching zero, e.g., each of those surfaces are substantially planar. Accordingly, the corresponding radiuses of curvatures R2, R4, R5 for the second, the third and the fourth surfaces 43, 45, 47, respectively, are each approaching infinity. The first surface 40 has a first curvature C1 with radius of curvature R1 which typically ranges between 2 inches and 8 feet, and more preferably ranges between about 6 inches and about 24 inches or so.

The first average curvature A1 of the first member 1 has a first average radius of curvature R3 which typically ranges between 2 inches and 8 feet, and more preferably ranges between about 6 inches and about 24 inches or so; the second average curvature A2 for the second member 2 has a second average radius of curvature R6 which is approaching infinity; and the device average curvature A3 has a device average radius of curvature R7 which typically ranges between 2 inches and 8 feet, and more preferably ranges between about 6 inches and about 24 inches or so.

Turning now to FIG. 7I, as generally shown therein, the first member 1 has a generally curved outwardly facing first surface 40 and a generally planar second surface 43, while the second member 2 has a generally planar third surface 45 and a generally planar outwardly facing fourth surface 47. As shown, the outwardly facing first surface 40 is formed of a series of sequentially interconnected generally planar surfaces which together comprise and form the generally curved outwardly facing first surface 40 and the outwardly facing fourth surface 47 is also formed of a series of sequentially interconnected generally planar surfaces which together comprise and form the generally curved outwardly facing fourth surface 47. Therefore, the first curvature C1 of the outwardly facing first surface 40 of the first member 1 and the fourth curvature C4 of the inwardly facing fourth surface 47 of the second member 2 are the only curved surfaces, in this embodiment, that have curvatures greater than zero. Likewise, both the first and the fourth radiuses of curvature R1, R5 are the only radiuses of curvature that do not approach infinity but instead, are each between 2 inches and 8 feet, and more preferably range between about 6 inches and about 24 inches or so.

The second and the third surfaces 43, 45, respectively, have second and third curvatures C2, C3 which each approach zero, e.g., each of those surfaces are substantially planar. Accordingly, the corresponding radiuses of curvatures R2, R4, for the second and the third surfaces 43, 45, respectively, are each approaching infinity.

The first average curvature A1 of the first member 1 has a first average radius of curvature R3 for the first member 1 which typically ranges between 2 inches and 8 feet, and more preferably ranges between about 6 inches and about 24 inches or so: the second average curvature A2 for the second member 2 has a second average radius of curvature R6 which typically ranges between 2 inches and 8 feet, and more preferably ranges between about 6 inches and about 24 inches or so; and the device average curvature A3 has a device average radius of curvature R7 which typically ranges between 2 inches and 8 feet, and more preferably ranges between about 6 inches and about 24 inches or so.

While each of FIGS. 7A-7I were described as having surfaces with curvatures which generally extend parallel to a longitudinal axis of the mobile communication device, it is to be appreciated that the mobile communication device may also have surfaces with curvatures which extend substantially normal to the longitudinal axis of the mobile communication device, e.g., the curvature is from edge to edge of the first and second members 1, 2 rather than from end to end of the first and second members 1, 2. Further, it is to be appreciated that the mobile communication device may also comprise both: (1) surfaces with curvatures which extend parallel to longitudinal axis of the mobile communication device and (2) surfaces with curvatures which extend substantially normal to the longitudinal axis of the mobile communication device.

In the above description and appended drawings, it is to be appreciated that only the terms "consisting of" and "consisting only of" are to be construed in the limitative sense while of all other terms are to be construed as being open-ended and given the broadest possible meaning.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

I claim:

1. A mobile communication device comprising:
   a first member having:
      a central thickness,
      a pair of opposed end thicknesses,
      a first surface with a first radius of curvature, and
      a second surface with a second radius of curvature;
   a second member having:
      a central thickness,
      a pair of opposed end thicknesses,
      a third surface with a third radius of curvature, and
      a fourth surface with a fourth radius of curvature;
   a hinge pivotally connecting ends of the first and second members with one another such that the first and the second members are pivotally movable between an opened configuration and a closed configuration;
   a display screen located on the second surface and a display screen located on the third surface;
   wherein if the first and the second radiuses of curvature of the first member are averaged together, then such average forms a first member average radius of curvature;
   if the third and the fourth radiuses of curvature of the second member are averaged together, then such average forms a second member average radius of curvature;
   if, when in the closed configuration, the first member average radius of curvature and the second member average radius of curvature are averaged together, then such average forms a device average radius of curvature for the communication device of 24 inches or less;
   the fourth radius of curvature is larger than each of the first radius of curvature, the second radius of curvature, the third radius of curvature, the first member average radius of curvature, the second member average radius of curvature and the device average radius of curvature; and
   the central thickness of the second member is greater than the end thicknesses of the second member.

2. The mobile communication device of claim 1, wherein at least one antenna is at least partially accommodated by both of the first and the second members.

3. The mobile communication device of claim 2, wherein when the device is in the opened configuration, the length of the at least one antenna is in a range from about 7 inches to about 8.5 inches.

4. The mobile communication device of claim 1, wherein the third surface is a continuously curved, continuously convex surface such that the third curvature extends uniformly from a first end to an opposite second end of the second member; and
   the fourth surface is a series of adjacent surfaces that join together and form a concave surface, which extends from the first end to the opposite second end of the second member, such that the central thickness of the second member is greater than the pair of opposed end thicknesses of the second member.

5. The mobile communication device of claim 1, wherein a camera, located in a corner of a second end remote from the hinge of the first member, is enclosed by a housing which protrudes from a corner of the first member and, when the communication device is pivoted into the closed configuration, fits into a well or depression provided in the second member.

6. The mobile communication device of claim 1, wherein an exterior shell of the device is padded at least at one end of the device and the edges of at least one of the first and the second members are flexible and the flexible edges provide a shock absorbing benefit in an event that the device is dropped.

7. The mobile communication device of claim 2, wherein at least two of the first, the second, the third and the fourth radiuses of curvatures are 24 inches or less.

8. The mobile communication device of claim 1, wherein at least one-two of the first, the second, the third, and the fourth radiuses of curvatures is less than 24 inches.

9. The mobile communication device of claim 1, further comprising an earphone which protrudes from an end corner of the first member opposite the hinge and a microphone located adjacent to the hinge.

10. A mobile communication device comprising:
a first member having a first surface with a first radius of curvature and a second surface with a second radius of curvature;
a second member having a third surface with a third radius of curvature and a fourth surface with a fourth radius of curvature; and
the first and the second members are pivotally movable between an opened configuration and a closed configuration via a hinge and when in the closed configuration, the second and the third surfaces face one another and the first and the fourth surfaces being exposed;
wherein at least one antenna is accommodated in part by both of the first and the second members;
a curved display screen having a radius of curvature of 24 inches or less located on the second surface;
a display screen located on the third surface;
if the first and the second radiuses of the first member are averaged together, then such average forms a first member average radius of curvature;
if the third and the fourth radiuses of the second member are averaged together, then such average forms a second member average radius of curvature; and
when the communication device is in the closed configuration, the second member average radius of curvature is concave with respect to the communication device, and the first member average radius of curvature is convex with respect to the communication device, such that if the first member average radius of curvature and the second member average radius of curvature are averaged together, then such average forms a device average radius of curvature of 24 inches or less.

11. The mobile communication device of claim 10, wherein an exterior shell of the device is padded at least at one end of the device and the edges of at least one of the first and the second members are flexible and the flexible edges provide a shock absorbing benefit in an event that the device is dropped.

12. The mobile communication device of claim 10, wherein a camera, located in a corner of a second end remote from a hinge of the first member, is enclosed by a housing which protrudes from a corner of the first member and, when the communication device is pivoted into the closed configuration, fits into a well or depression provided in the second member.

13. The mobile communication device of claim 10, further comprising an earphone which protrudes from an end corner of the first member opposite the hinge and a microphone located adjacent to the hinge.

14. A mobile communication device comprising:
a first member having a first member radius of curvature being an average of a first radius of curvature of a first surface and a second radius of curvature of a second surface;
a second member having a second member radius of curvature being an average of a third radius of curvature of a third surface and a fourth radius of curvature of a fourth surface;
the first and the second members are movable between an opened configuration and a closed configuration;
at least one curved display screen located on one of the second surface or the third surface, a second display screen; and
if the first member radius of curvature and the second member radius of curvature are averaged together, such average forms an average device radius of curvature for the communication device of 24 inches or less; and
a camera, located in a corner of a second end remote from a hinge of the first member, is enclosed by a housing which protrudes from a corner of the first member and, when the communication device is pivoted into the closed configuration, fits into well or depression provided in the second member.

15. The mobile communication device of claim 14, wherein the third surface is a continuous convexly curved surface that extends from a first end to an opposite second end of the second member so as to facilitate direction of a voice of the user toward the third surface and then reflection of the voice back toward the user; and
the fourth surface is a series of adjacent surfaces that join together and form a concave surface which extends from a first end to an opposed second end of the second member, such that a central thickness of the second member is greater than the thicknesses of the opposed ends of the second member.

16. The mobile communication device of claim 14, wherein at least two of the first, the second, the third, and the fourth radiuses of curvatures is less than 24 inches.

17. The mobile communication device of claim 14, wherein an exterior shell of the device is padded at least at one end of the device and the edges of at least one of the first and the second members are flexible and the flexible edges provide a shock absorbing benefit in an event that the device is dropped.

18. The mobile communication device of claim 14, further comprising an earphone which protrudes from an end corner of the first member opposite the hinge and a microphone located adjacent to the hinge.

19. The mobile communication device of claim 14, wherein at least one antenna is at least partially accommodated by both of the first and the second members.

* * * * *